US009198138B2

(12) United States Patent
Yun

(10) Patent No.: US 9,198,138 B2
(45) Date of Patent: Nov. 24, 2015

(54) DEVICE AND METHOD FOR CONTROLLING POWER IN MOBILE TERMINAL

(71) Applicant: Samsung Electronics Co., Ltd., Suwon-si, Gyeonggi-do (KR)

(72) Inventor: Yong Seob Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/310,588

(22) Filed: Jun. 20, 2014

(65) Prior Publication Data

US 2014/0302886 A1    Oct. 9, 2014

Related U.S. Application Data

(63) Continuation of application No. 13/246,238, filed on Sep. 27, 2011, now Pat. No. 8,798,664.

(30) Foreign Application Priority Data

Sep. 28, 2010    (KR) .................. 10-2010-0093769

(51) Int. Cl.
| | |
|---|---|
| *H04B 7/00* | (2006.01) |
| *H04W 52/18* | (2009.01) |
| *H04B 5/02* | (2006.01) |
| *H04W 52/22* | (2009.01) |
| *H04W 52/28* | (2009.01) |
| *H04W 52/52* | (2009.01) |
| *H04B 7/08* | (2006.01) |
| *H04B 1/3827* | (2015.01) |
| *H04W 52/36* | (2009.01) |

(52) U.S. Cl.
CPC ............. *H04W 52/18* (2013.01); *H04B 1/3838* (2013.01); *H04B 5/02* (2013.01); *H04B 7/0834* (2013.01); *H04W 52/226* (2013.01); *H04W 52/228* (2013.01); *H04W 52/283* (2013.01); *H04W 52/52* (2013.01); *H04B 1/3833* (2013.01); *H04W 52/367* (2013.01)

(58) Field of Classification Search
CPC ............................ H04B 1/3838; H04B 1/3833
USPC ............... 455/522, 68, 69, 127.1, 500, 550.1, 455/575.1, 575.7, 422.1, 403, 426.1, 426.2, 455/445, 412.1, 412.2, 432.1–432.3; 370/522, 68, 69, 127.1, 500, 550.1, 370/575.1, 575.7, 422.1, 403, 426.1, 426.2, 370/445, 412.1, 412.2, 432.1–432.3, 310, 370/328, 329
See application file for complete search history.

(56) References Cited

U.S. PATENT DOCUMENTS

| | | |
|---|---|---|
| 8,417,296 B2 | 4/2013 | Caballero et al. |
| 8,538,351 B2 | 9/2013 | Wilson et al. |

(Continued)

*Primary Examiner* — Keith Ferguson
(74) *Attorney, Agent, or Firm* — Jefferson IP Law, LLP

(57) ABSTRACT

A device and a method for controlling a transmission power in a mobile terminal are provided. The device includes an antenna set in an optimized state, a memory including a power control table that includes transmission power control data for satisfying a Specific Absorption Rate (SAR) standard in a state where efficiency of the antenna is optimized, a sensor for detecting a distance between the mobile terminal and a user, a controller for receiving distance data from the sensor and for outputting transmission power control data corresponding to the distance data by referring to the power control table, and a power amplifier connected between a transmitter and the antenna for controlling transmission power of a signal according to the transmission power control data and for outputting the signal to the antenna.

20 Claims, 2 Drawing Sheets

(56) References Cited

U.S. PATENT DOCUMENTS

| | | |
|---|---|---|
| 2003/0064761 A1* | 4/2003 | Nevermann .................. 455/572 |
| 2003/0210203 A1 | 11/2003 | Phillips et al. |
| 2005/0124305 A1 | 6/2005 | Stichelbout |
| 2010/0317302 A1* | 12/2010 | Greenwood et al. ....... 455/127.1 |
| 2011/0012793 A1* | 1/2011 | Amm et al. .................. 343/702 |
| 2012/0208478 A1 | 8/2012 | Greenwood et al. |
| 2013/0172045 A1 | 7/2013 | Caballero et al. |

* cited by examiner

DEVICE AND METHOD FOR CONTROLLING POWER IN MOBILE TERMINAL

CROSS-REFERENCE TO RELATED APPLICATION(S)

This application is a continuation application of a prior application Ser. No. 13/246,238, filed on Sep. 27, 2011, which claimed the benefit under 35 U.S.C. §119(a) of a Korean patent application filed on Sep. 28, 2010 in the Korean Intellectual Property Office and assigned Serial number 10-2010-0093769, the entire disclosure of which is hereby incorporated by reference.

BACKGROUND OF THE INVENTION

1. Field of the Invention

The present invention relates to a device and a method for controlling transmission power in a mobile terminal. More particularly, the present invention relates to a device and a method for satisfying a Specific Absorption Rate (SAR) standard by controlling transmission power depending on a distance between a mobile terminal and a user.

2. Description of the Related Art

Generally, a mobile terminal is used in such a manner that the mobile terminal is disposed adjacent to a user's head between the user's ear and mouth. In this case, the electromagnetic wave generated in the mobile terminal during a call may affect the health of the user. Therefore, every country designs a Specific Absorption Rate (SAR) standard to define the permissible amount of electromagnetic energy the mobile terminal may generate. The SAR standard for the bands of each region is different. For example, in a case of European bands (e.g., GSM900, DCS, W900, W2100), the SAR standard is 2.0 W/kg (10 g average). Whereas, in a case of Central and South American bands (e.g., GSM850, PCS, W850, W1900), the SAR standard is 1.6 W/KG (1 g average), which is a more stringent SAR standard. A method for controlling the performance of an antenna is used in the related art to satisfy the SAR standard. In this case, the performance of the antenna is unable to be optimized so that the SAR International standard may be satisfied (i.e., avoid a failure or margin shortfall) even when the performance of the antenna in free space can be sufficiently enhanced. For example, in a case where the mobile terminal is being brought to a global market, it might be necessary to lower the performance of the antenna of the mobile terminal so as to satisfy (i.e., avoid a failure or margin shortfall) the SAR standard in the Central and South American bands where the SAR standard is more stringent than the European bands. This is more likely the case when a mobile terminal for Central and South America is developed after completing the development of the optimized performance of the antenna for Europe. Hence, in the mobile terminal of the related art, the performance of the antenna cannot be optimized so that the SAR International standard is satisfied, even when the performance of the antenna in free space can be sufficiently enhanced. Accordingly, the performance of an antenna is lowered to the free space transmission and reception rate. In order to address such a problem, when antennas corresponding to respective mobile terminals (i.e., a mobile terminal for Europe and a mobile terminal for Central and South America) using a different SAR standard are used, there is a delay in the development of an antenna and an increase in costs such as a maintenance cost and an inventory cost.

SUMMARY OF THE INVENTION

Aspects of the present invention are to address at least the above-mentioned problems and/or disadvantages and to provide at least the advantages described below. Accordingly, an aspect of the present invention is to provide a device for reducing Total Radiated Power (TRP) of an antenna of a total or specific band at a close proximity of a mobile terminal while achieving a high performance of the antenna in free space, and a method thereof.

Another aspect of the present invention is to measure a distance between a user and a mobile terminal using a sensor (e.g., a proximity sensor), and control transmission power according to the measured result to maximize the antenna performance while satisfying human head SAR.

In accordance with an aspect of the present invention, a device for controlling transmission power in a mobile terminal is provided. The device includes an antenna set in an optimized state, a memory including a power control table that includes transmission power control data for satisfying a Specific Absorption Rate (SAR) standard in a state where efficiency of the antenna is optimized, a sensor for detecting a distance between the mobile terminal and a user, a controller for receiving distance data from the sensor and for outputting transmission power control data corresponding to the distance data by referring to the power control table, and a power amplifier connected between a transmitter and the antenna for controlling transmission power of a signal according to the transmission power control data and for outputting the signal to the antenna.

In accordance with another aspect of the present invention, a method for controlling transmission power in a mobile terminal is provided. The method includes detecting a distance between the mobile terminal and a user in a call mode, wherein the mobile terminal includes a power control table that includes transmission power control data for satisfying a Specific Absorption Rate (SAR) standard in a state where efficiency of an antenna is optimized, acquiring transmission power control data corresponding to the detected distance from the power control table, when the detected distance is less than a preset distance, and controlling transmission power of a signal according to the transmission power control data.

In accordance with another aspect of the present invention, a device for controlling transmission power in a mobile terminal is provided. The device includes an antenna set in an optimized state, a memory including a plurality of power control tables according to a SAR standard of a country or zone, the plurality of power control tables including transmission power control data for satisfying a Specific Absorption Rate (SAR) standard in a state where efficiency of the antenna is optimized, a sensor for detecting a distance between the mobile terminal and a user, a controller for selecting a power control table of a country or zone in which the mobile terminal is located, for receiving the detected distance data from the sensor in a call mode, and for outputting transmission power control data corresponding to the detected distance by referring to the power control table, and a power amplifier connected between a transmitter and the antenna for controlling transmission power of a signal according to the transmission power control data and for outputting the signal to the antenna.

In accordance with another aspect of the present invention, a method for controlling transmission power in a mobile terminal is provided. The method includes setting a power control table of a country or zone in which the mobile terminal is located, wherein the mobile terminal includes a memory that includes a plurality of power tables according to a Specific Absorption Rate (SAR) standard of a country or zone, the power table including transmission power control data for satisfying a SAR standard in a state where efficiency of an antenna is optimized, detecting a distance between the mobile terminal and a user in a call mode, acquiring transmission power control data corresponding to the detected distance from the power control table, when the detected distance is less than a preset distance, and controlling transmission power of a signal according to the transmission power control data.

Therefore, a mobile terminal according to exemplary embodiments of the present invention may maximize the performance of an antenna in free space. The same material is applicable to antennas of mobile terminals (e.g., mobile terminals for Europe and America/Central and South America) having different SAR standards to reduce a development time and cost of a mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A mobile terminal according to an exemplary embodiment of the present invention optimizes the performance of an antenna, measures a distance between the mobile terminal and a user using a sensor (e.g., a proximity sensor), and controls power of a transmission signal to satisfy a Specific Absorption Rate (SAR) standard. Accordingly, a mobile terminal according to an exemplary embodiment of the present invention may control Total Radiated Power (TRP) of an antenna according to a distance between a user and the mobile terminal while achieving a high performance of the antenna, thereby dynamically satisfying the SAR standard.

Figure 1:
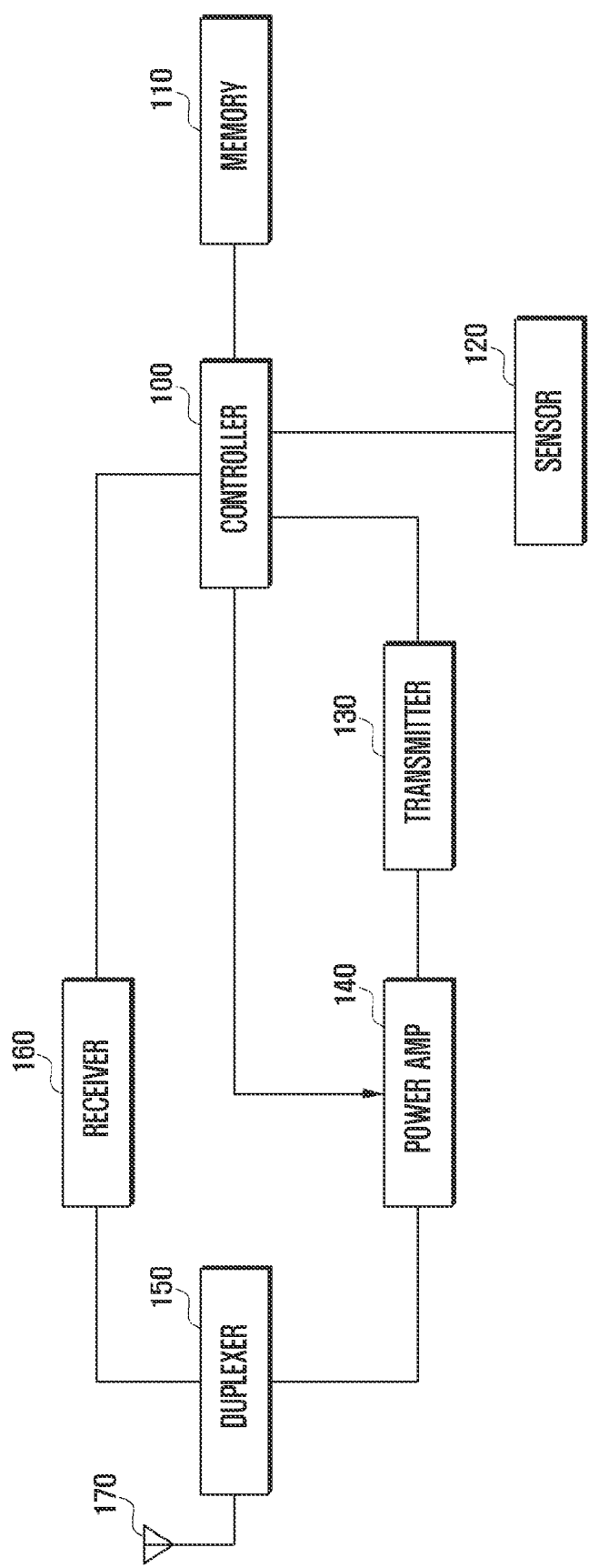
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, the mobile terminal includes a controller 100, a memory 110, a sensor 120, a transmitter 130, a power amplifier 140, a duplexer 150, a receiver 160, and an antenna 170. The duplexer 150 transfers a signal received through the antenna 170 to a receiver 160, and performs transmission/reception of a Radio Frequency (RF) signal through the antenna 170 based on a signal output from a power amplifier 140. The receiver 160 RF-converts and frequency-down-converts a signal received through the duplexer 160 into a baseband signal. Further, the receiver 160 may include a demodulator and a decoder. In this case, the receiver 160 demodulates and decodes the baseband signal.

The sensor 120 detects a distance between the mobile terminal and a user. The sensor 120 may be a proximity sensor. The proximity sensor is used to determine whether an object approaches another object before contacting it. The proximity sensor may be classified into high frequency transmittance type, a capacitive type, a magnetic type, a photoelectric type, and an ultrasound type. Here, the sensor 120 may use an optical proximity sensor or an ultrasound proximity sensor. In this case, when the sensor 120 is the optical proximity sensor, the sensor 120 includes a light emitting unit and a light receiving unit.

Further, the sensor 120 may include a sensing unit for measuring a distance between the mobile terminal and a user. At this time, the sensing unit may be configured as one of two types. A first type of sensing unit detects whether the light receiving unit receives a light source emitted from the sensor 120. In this case, the sensing unit may be an optical sensing unit or a distance sensing unit. When the light receiving unit receives a light source emitted from the light emitting unit of the sensor 120, the optical sensing unit generates a detecting signal indicating that the mobile terminal approaches the user. When the light receiving unit does not receive the light source emitted from the light emitting unit of the sensor 120, the optical sensing unit generates a detecting signal indicating that the mobile terminal is spaced apart from the user. At this time, the optical sensing unit may measure an amount and intensity of received light to calculate a distance between a user and a mobile terminal. When the light receiving unit receives the light source emitted from the light emitting unit, the second type of sensing unit further calculates a difference between a light emitting time and a light receiving time to calculate a distance between the user and the mobile terminal. When the light receiving unit does not receive the light source, the sensing unit detecting the distance does not generate a detecting signal. When the light receiving unit receives the light source, the sensing unit calculates a distance between a light emitting signal and a light receiving signal and a detecting signal to output a distance data between the mobile terminal and the user. Although it is assumed in an exemplary embodiment of the present invention that the sensing unit has a distance sensing function, the same results may be obtained with the first type sensing unit.

The memory 10 includes a program memory for storing programs that control operations of the mobile terminal, and a data memory for storing data used when executing programs and data created during the execution of the programs. The data includes a power control table for controlling transmission power according to a distance between the mobile terminal and the user while satisfying the SAR standard for the frequency band according to an exemplary embodiment of the present invention.

The controller 100 performs a function of controlling overall operations of the mobile terminal. Further, when the sensor 120 does not include a sensing unit, the controller 100 may further include the sensing unit. When the receiver 160 and a transmitter 130 do not have modem and codec functions, the controller 100 may include the modem and codec functions and may further include a data processor for modulating/demodulating and encoding/decoding transmission and reception data. The controller 100 analyzes a detecting signal received from the sensor 120. When a distance between the user and the mobile terminal is less than a preset distance, the controller 100 generates a power control signal for controlling transmission power.

The transmitter 130 frequency-up-converts a transmission signal generated by a sender (not shown) or a peripheral interface. Here, the transmitter 130 may include an encoder for encoding a signal and a modulator for modulating an encoded signal.

The power amplifier controls power of a signal output from the transmitter 130 and transfers the amplified signal to the duplexer 150. At this time, the power amplifier 140 controls power of a transmission signal output from the transmitter 130 according to a power control signal output from the controller 100. Here, the power amplifier may be a linear power amplifier.

The power control table stored in the memory 110 is configured by data for controlling transmission power to satisfy a SAR standard in an optimized state (namely, a set state of maximum antenna efficiency) of antenna gain. Here, assuming that maximum transmission power is 33 dBm, an antenna optimization value is dBi, and SAR is 1.6 W/kg, transmission power is changed according to a distance detected while having a high performance of the antenna to satisfy the SAR standard. In this case, since transmission power is only controlled according to a distance between the mobile terminal and the user, reception efficiency of a receiving side may be improved while satisfying the SAR standard. At this time, the SAR standard may change according to countries or zones (e.g., Central and South America, Europe, etc.). Accordingly, the power control table stored in the memory 110 may be a power control table configured corresponding to a country or a zone in which the mobile terminal is used. Further, if the mobile terminal can process signals of plural bands using different SAR standards, it may include power control tables of the corresponding SAR standards.

First, the controller 100 determines a type (e.g., WCDMA850, WCDMA 1900, etc.) of terminal upon initialization of a system, determines the SAR standard according to the determined type of terminal, and determines a power control table according to the determined SAR standard. Here, the power control table is stored in the memory 110. The power control table is a look-up table storing information for controlling transmission power of a terminal according to a distance between the mobile terminal and a user. The power control table may include distance data and transmission power control data corresponding thereto.

In the foregoing state, the controller 100 determines a distance between the mobile terminal and the user based on the output of the sensor 120. Next, the controller 100 determines transmission power control data corresponding to the determined distance from the power control table of the memory 110 and then outputs the transmission power control data to the power amplifier 140. In this case, the power amplifier 140 controls transmission power of a signal output from the transmitter 130 according to the transmission power control data, and outputs the signal through the antenna 170.

Accordingly, the mobile terminal uses the sensor 120 to determine whether the user brings the mobile terminal toward the ear when the mobile terminal is in a call state. If the user brings the mobile terminal toward the ear and the mobile terminal is in a call state, the mobile terminal determines the distance there between so as to control the transmission power of a signal. The transmission power control data output from the controller 100 may be a signal controlling output of the power amplifier to an amplitude capable of satisfying the SAR standard according to the determined distance. Accordingly, upon manufacturing the mobile terminal, the SAR standard may be satisfied without changing the performance of the antenna. At this time, since the receiver 160 receives a signal in a state where the antenna has a high performance, although transmission power changes, reception power maintains as it is. Thus, constant reception efficiency may be retained regardless of a use method of the mobile terminal by the user.

Figure 2:
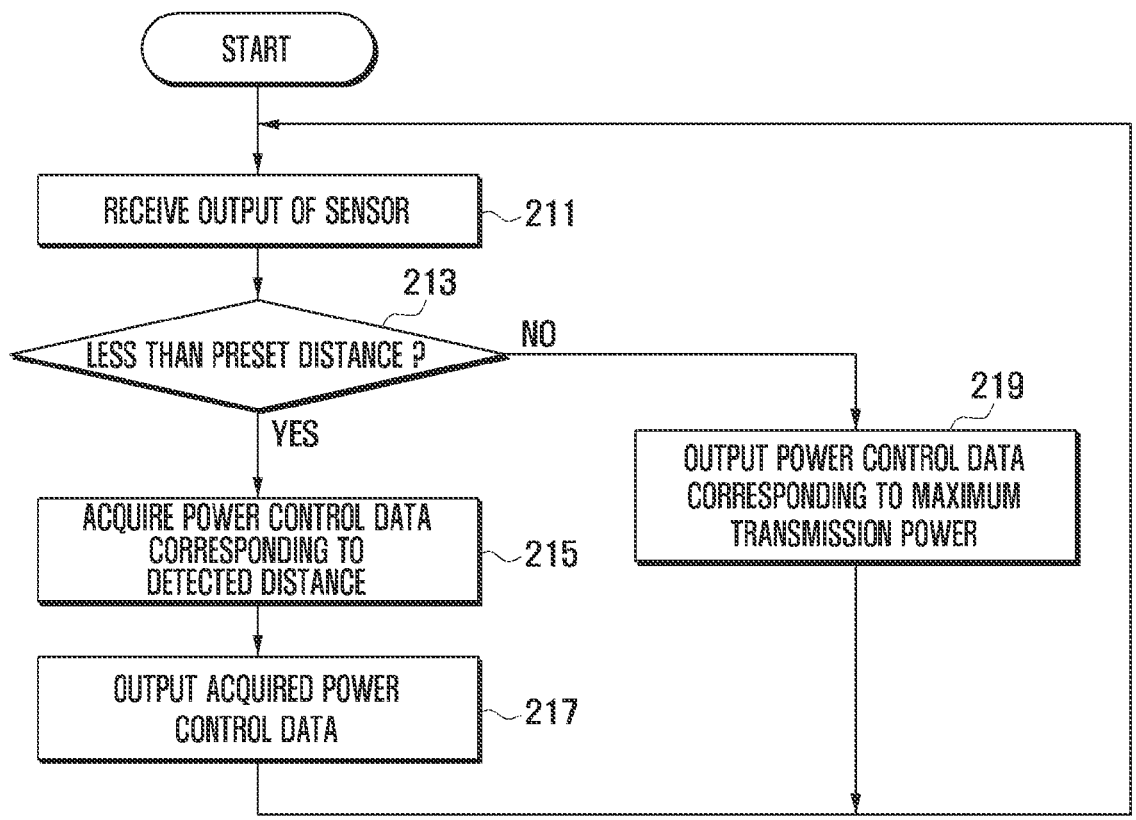
FIG. 2 is a flowchart illustrating a method for controlling Specific Absorption Rate (SAR) of a mobile terminal according to an exemplary embodiment of the present invention.

FIG. 2 is a flowchart illustrating a method for controlling power of a mobile terminal according to an exemplary embodiment of the present invention.

Referring to FIG. 2, a controller 100 receives the output of the sensor 120 in step 211. In this case, the sensor 120 may be a proximity sensor. Further, the controller 100 calculates a distance between the mobile terminal and a user based on the output of the sensor 120. A sensing unit for determining the distance may be included in the sensor 120. The sensing unit may be provided between the sensor 120 and the controller 100, or inside the controller 100. Next, the controller 100 determines whether the determined distance is less than a preset distance by referring to the power control table of a memory 110 in step 213. Here, the preset distance may refer to a reference distance capable of transmitting a signal with a maximum transmission power of a power amplifier 140 without controlling transmission power in a state satisfying a SAR standard. If it is determined that the determined distance between the mobile terminal and the user exceeds the preset distance (that is, the mobile terminal is sufficiently spaced apart from the user), the controller 100 outputs transmission power control data to the power amplifier 140 such that the power amplifier 140 can amplify power of a signal to a maximum transmission power in step 219. Accordingly, the transmission signal output from the transmitter 130 is amplified to maximum transmission power by the power amplifier 140 and the amplified signal is output through the duplexer 150. The signal received through the duplexer 150 is processed by the receiver 160.

Conversely, when the detected distance (i.e., the distance between the mobile terminal and the user) is less than the preset distance at step 213, the controller 100 acquires the transmission power control data corresponding to the detected distance with reference to the power control table of the memory 110 in step 215, and outputs the transmission power control data to the power amplifier 140 in step 217. At this time, the transmission power control data is used to reduce the transmission power to satisfy the SAR standard in a state where the performance of the antenna is optimized. The power control may occur when the mobile terminal contacts or is proximate to an ear of a user. In this case, the controller 100 performs a control operation for reducing the transmission power to satisfy the SAR standard. At this time, the controller 100 satisfies the SAR standard while reducing the transmission power while a received signal is not influenced. When the mobile terminal includes a plurality of power control tables for satisfying a plurality of SAR standards, that is, when the mobile terminal is a mobile terminal usable in a plurality of countries or zones having different SAR standards, the mobile terminal may further includes an operation procedure for determining a country or a zone where a current mobile terminal is located upon powering on, and setting a power control table corresponding to the determined country or zone. That is, when the mobile terminal is a mobile terminal including an RF communication unit having two or more bands with different SAR standards, the mobile terminal further includes respective power control tables corresponding to the plurality of SAR standards. In a booting procedure of the mobile terminal, a power control table is set corresponding to the SAR standard of a country or zone in which the mobile terminal is located, and transmission power is controlled using the set power control table in a call mode.

As illustrated above, exemplary embodiments of the present invention control transmission power according to a state in which the mobile terminal approaches the user and when the performance of antenna is optimized, thereby efficiently controlling transmission and reception operation while satisfying a SAR standard.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a transmission power in an electronic device, the method comprising:
   detecting, via a sensor operatively coupled with the electronic device, a distance between a user and the electronic device, the electronic device set to receive a reception signal transmitted using a first power and to transmit a transmission signal using a second power;
   adjusting the second power to produce a third power based at least in part on the distance; and
   transmitting the transmission signal using the third power if the distance falls into a specified range.

2. The method of claim 1, wherein the sensor comprises a proximity sensor.

3. The method of claim 1, wherein the adjusting of the second power to produce the third power based at least in part on the distance comprises:
   acquiring, from a power control table stored at the electronic device, power control data corresponding to the distance; and
   determining the third power according to the power control data.

4. The method of claim 3, wherein the acquiring of the power control data corresponding to the distance comprises:
   selecting the power control table from a plurality of power control tables based at least in part on a location of the electronic device.

5. The method of claim 3, wherein the power control table comprises a first power control table and a second power control table, the first power control table including first transmission power control data corresponding to a first country or a first area, and the second power control table including second transmission power control data corresponding to a second country or a second area.

6. The method of claim 1, wherein the adjusting of the second power to produce the third power based at least in part on the distance comprises:
   decreasing or increasing the third power as the distance is decreased or increased, respectively.

7. The method of claim 1, wherein the adjusting of the second power to produce the third power based at least in part on the distance comprises:
   selecting, as the third power, a power that satisfies a Specific Absorption Rate (SAR) standard of a country or area in which the electronic device is located.

8. The method of claim 1, wherein the transmitting of the transmission signal using the third power comprises:
   transmitting the transmission signal using the second power if the distance does not fall into the specified range.

9. The method of claim 1, wherein the transmitting of the transmission signal using the third power comprises:
   maintaining a reception efficiency to receive the reception signal.

10. The method of claim 1, wherein the detecting of the distance between the user and the electronic device comprises:
    detecting the distance while the electronic device is in a call mode.

11. An apparatus comprising:
    an antenna configured to transmit and receive a signal;
    a sensor configured to detect a distance between a user and the apparatus; and
    a controller operatively coupled with the antenna, the controller configured to receive, via the antenna, a reception signal transmitted using a first power and to transmit a transmission signal using a second power, to adjust the second power to produce a third power based at least in part on the distance, and to transmit, via the antenna, the transmission signal using the third power if the distance falls into a specified range.

12. The apparatus of claim 11, wherein the sensor is further configured to detect the distance with a proximity sensor.

13. The apparatus of claim 11, further comprising:
    a memory configured to store a power control table,
    wherein the controller is further configured to acquire, from the power control table, power control data corresponding to the distance; and to determine the third power according to the power control data.

14. The apparatus of claim 11, wherein the controller is further configured to select the power control table from a plurality of power control tables based at least in part on a location of the apparatus.

15. The apparatus of claim 14, wherein the power control table comprises a first power control table and a second power control table, the first power control table including first transmission power control data corresponding to a first country or a first area, and the second power control table including second transmission power control data corresponding to a second country or a second area.

16. The apparatus of claim 11, wherein the controller is further configured to decrease or increase the third power as the distance is decreased or increased, respectively.

17. The apparatus of claim 11, wherein the controller is further configured to select, as the third power, a power that satisfies a Specific Absorption Rate (SAR) standard of a country or area in which the apparatus is located.

18. The apparatus of claim 11, further comprising:
    an amplifier configured to amplify the transmission signal using the second power or the third power.

19. The apparatus of claim 18, wherein the controller is further configured to transmit, via the antenna, the transmission signal using the second power if the distance does not fall into the specified range.

20. A non-transitory machine-readable storage device storing instructions that, when executed by one or more processors, cause the one or more processors to perform a method for controlling a transmission power in an electronic device, the method comprising:
- detecting, via a sensor operatively coupled with the electronic device, a distance between a user and the electronic device, the electronic device set to receive a reception signal transmitted using a first power and to transmit a transmission signal using a second power;
- adjusting the second power to produce a third power based at least in part on the distance; and
- transmitting the transmission signal using the third power if the distance falls into a specified range.

* * * * *